(12) United States Patent
Carroll (10) Patent No.: US 10,759,393 B2
(45) Date of Patent: Sep. 1, 2020

(54) SNOW AND ICE REMOVAL DEVICE (71) Applicant: James Clark Carroll, Milton, DE (US)

(72) Inventor: James Clark Carroll, Milton, DE (US)

( * ) Notice: Subject to any disclaimer, the term of this patent is extended or adjusted under 35 U.S.C. 154(b) by 0 days.

(21) Appl. No.: 16/408,966

(22) Filed: May 10, 2019

(65) Prior Publication Data
US 2019/0263361 A1    Aug. 29, 2019

Related U.S. Application Data (63) Continuation-in-part of application No. 15/882,314, filed on Jan. 29, 2018, now Pat. No. 10,286,881, which is a continuation-in-part of application No. 15/691,830, filed on Aug. 31, 2017, now Pat. No. 10,266,153.

(51) Int. Cl.
*B60S 1/66* (2006.01)
*H05B 3/26* (2006.01)

(52) U.S. Cl.
CPC . *B60S 1/66* (2013.01); *H05B 3/26* (2013.01)

(58) Field of Classification Search
CPC .... B60S 1/66; H05B 3/26; H05B 3/28; H05B 3/34; H05B 3/36; H05B 3/40; H05B 3/48; H05B 3/46; H05B 3/44; H05B 3/66; H05B 3/0042; H05B 3/18; H05B 3/16; H05B 1/0236; H05B 2214/02; H05B 2203/002; H05B 2203/003; H05B 2203/004; H05B 2203/012; H05B 2203/013; H05B 2203/017; B05B 12/04; B05B 1/205; B05B 1/005; B05B 9/04; B05B 9/002; B05B 9/007
See application file for complete search history.

(56) References Cited

U.S. PATENT DOCUMENTS

| | | | |
|---|---|---|---|
| 6,696,674 B1 * | 2/2004 | Doornsbosch | H05B 3/36 219/528 |
| 7,783,400 B1 | 8/2010 | Zimler | |
| 10,266,153 B2 | 4/2019 | Carroll | |
| 10,286,881 B2 | 5/2019 | Carroll | |
| 2009/0101632 A1 * | 4/2009 | Naylor | E01C 11/265 219/202 |
| 2011/0297659 A1 * | 12/2011 | Bixler | B60H 1/245 219/201 |
| 2012/0193067 A1 | 8/2012 | Miller | |
| 2014/0116077 A1 | 5/2014 | Pierce et al. | |

* cited by examiner

*Primary Examiner* — Shawntina T Fuqua
(74) *Attorney, Agent, or Firm* — Caesar Rivise, PC (57) ABSTRACT

A snow and ice removal device may include one or more, heating elements. A control unit may be configured to control the heating element to produce heat. A power source may be in electrical communication with the control unit and the heating element. Heat may be applied to the roof surface by the heating element to loosen and/or melt accumulated ice or snow from the roof surface of the vehicle.

20 Claims, 6 Drawing Sheets

SNOW AND ICE REMOVAL DEVICE

CROSS REFERENCE TO RELATED APPLICATIONS

This application is a continuation-in-part of U.S. Non-Provisional application Ser. No. 15/882,314, filed on Jan. 29, 2018, entitled "SNOW AND ICE REMOVAL DEVICE", now U.S. Pat. No. 10,286,881, which is a continuation-in-part of U.S. Non-Provisional application Ser. No. 15/691,830, filed on Aug. 31, 2017, entitled "SNOW AND ICE REMOVAL DEVICE", now U.S. Pat. No. 10,266,153, which applications are hereby incorporated by reference in their entirety.

FIELD OF THE INVENTION

This patent specification relates to the field of snow and ice removal from vehicles. More specifically, this patent specification relates to a device for preventing and removing snow and ice accumulation from the roof of a vehicle.

BACKGROUND

Large vehicles, such as tractor drawn trailers, trucks, and busses are widely used to transport goods. These vehicles typically have at least one large roof surface. In cooler climates ice and snow often accumulates on the roof surface of vehicles in the course of their use and storage. Unfortunately, as a vehicle moves, and especially at highway speeds, the snow and ice is propelled off the vehicle. Every year, people are seriously injured or killed by falling ice projectiles and blinding snow landing on the windshields of vehicles adjacent to or following directly behind these large vehicles.

While some vehicle operators will check and remove the snow and ice from the roof of their vehicle manually, this can be time consuming and labor intensive. Stationary apparatuses configured to remove snow and ice from the roof of vehicles exist, however, they large, expensive, and are only effective if the vehicle does not have to travel far in order to reach the apparatus. Other vehicle mounted snow and ice removal systems exist, but they are complex, expensive, and offer less than ideal results.

Therefore, a need exists for a novel device for preventing and removing snow and ice accumulation from the roof of a vehicle. There is also a need for novel snow and ice removal device which is not stationary or coupled to a ground or ground-based structure. A further need exists for novel snow and ice removal device that is not overly complex or expensive.

BRIEF SUMMARY OF THE INVENTION

A snow and ice removal device may include one or more, heating elements. A control unit may be configured to control the heating element to produce heat. A power source may be in electrical communication with the control unit and the heating element. Heat may be applied to the top surface (e.g. roof surface) by the heating element to loosen and/or melt accumulated ice or snow from the top surface of the vehicle.

In further embodiments, the device may include a heating element for producing heat and that is coupled to the roof surface. A control unit may be configured to govern the flow of electricity through a heating element to produce heat. A solar panel may be in communication with the control unit, and the solar panel may provide electrical power to the control unit.

Reserved

In further embodiments, the device may include one or more recharge units which may be in electrical communication with a power source and/or any other element of the device. A recharge unit may be configured to provide power to a power source, to re-charge a power source, and/or to provide electric power to an element of the device. Optionally, a recharge unit may include a solar cell or photovoltaic cell.

In yet further embodiments, a recharge unit may include a wind turbine which may be capable of generating electricity. For example, a wind turbine may be disposed in the aerodynamic cowling (or structure above the cab roof of a tractor or the like) to generate electrical energy for the heating elements grid, solenoids which may operate the air valves under forced air vent apertures, the charging and recharge of a power source, and/or optionally one or more other vehicle functions during vehicle operation.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 1:
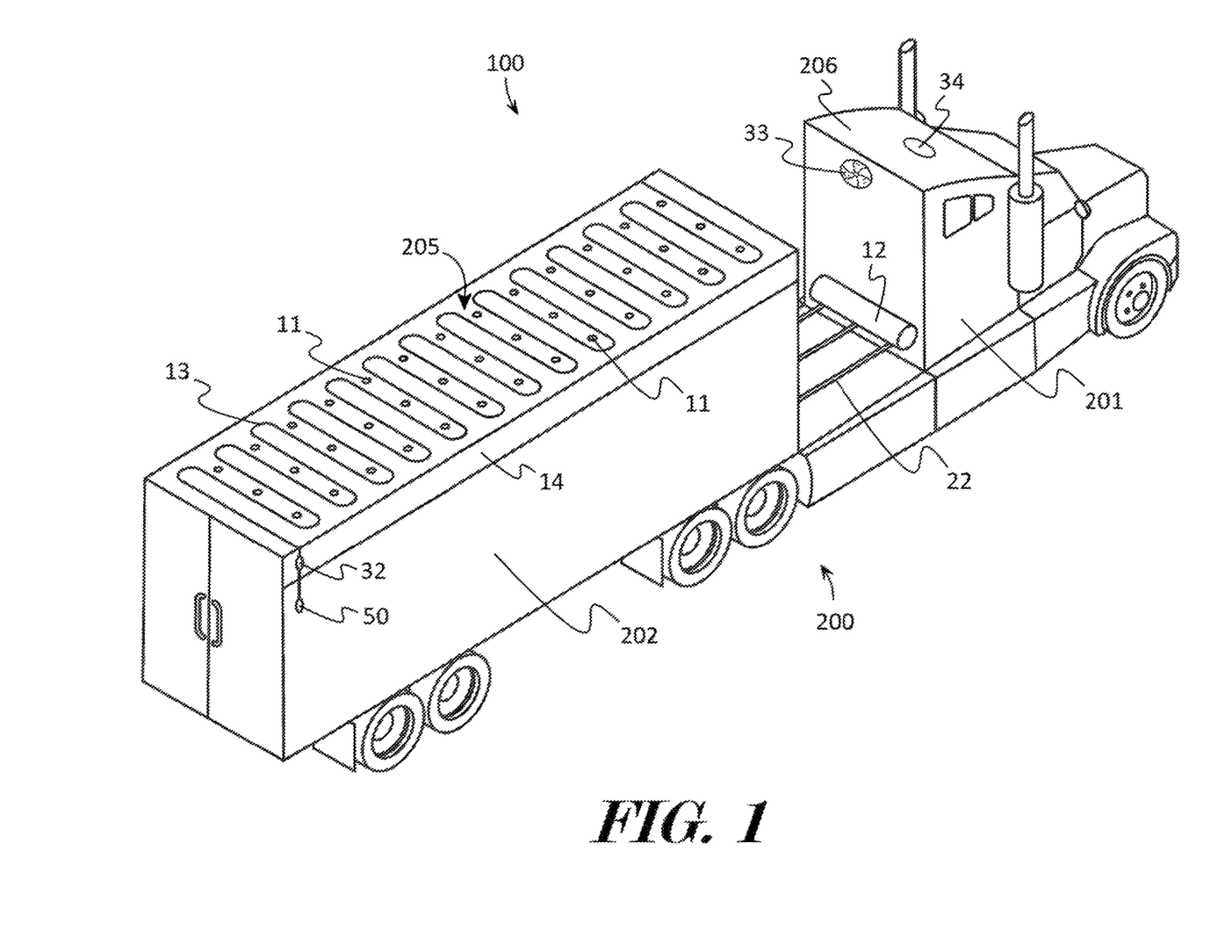
FIG. 1 depicts a top rear perspective view of an example of a snow and ice removal device coupled to an exemplary vehicle according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A new device for preventing and removing snow and ice accumulation from the roof of a vehicle is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 2:
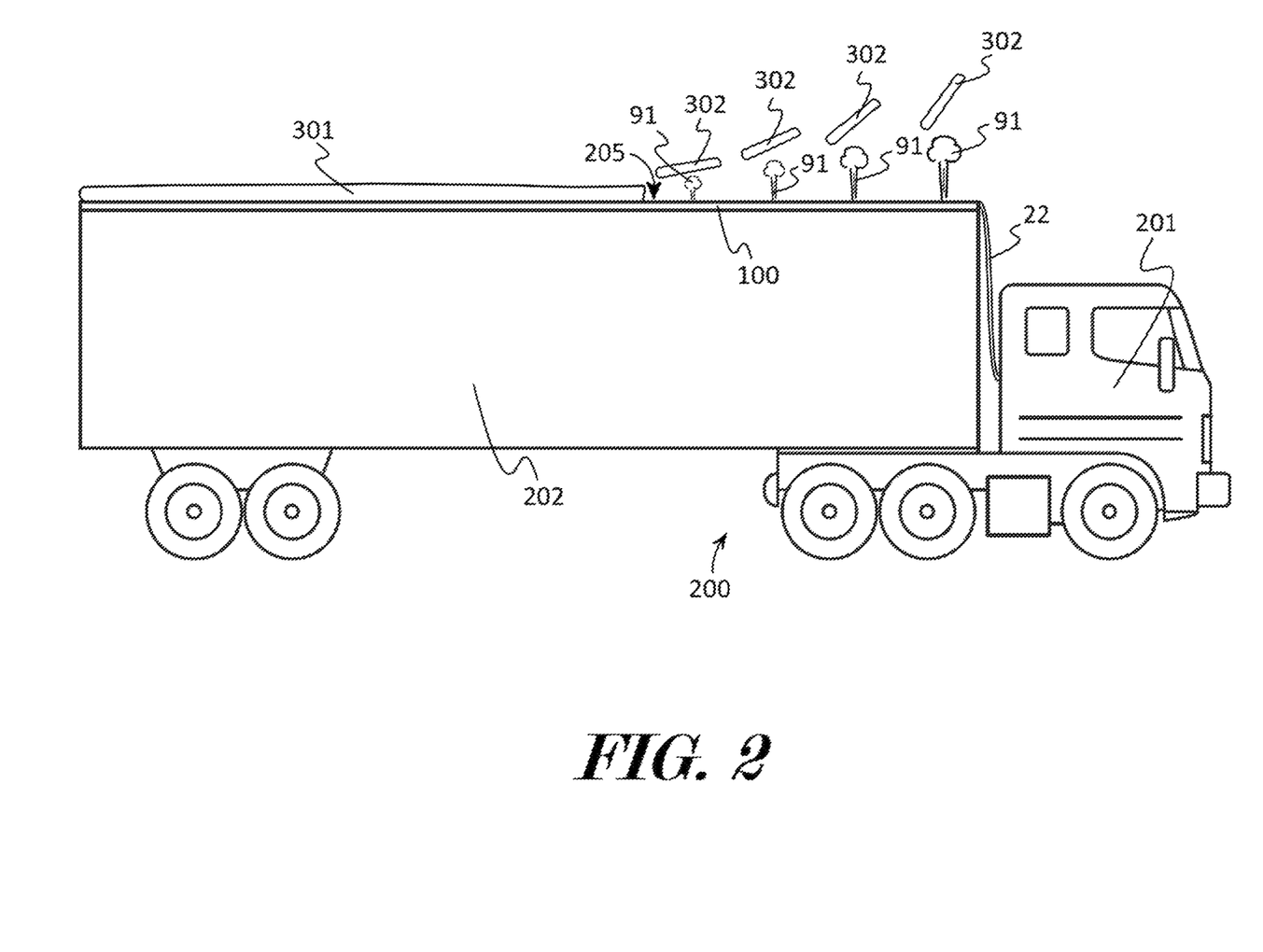
FIG. 2 illustrates a side elevation view of an example of a snow and ice removal device coupled to another exemplary vehicle according to various embodiments described herein.

The present invention will now be described by example and through referencing the appended figures representing preferred and alternative embodiments. FIGS. 1 and 2 illustrate examples of a snow and ice removal device ("the device") 100 according to various embodiments. The device 100 may be used to prevent and remove snow and ice accumulation 301 from all or portions of a vehicle 200, such as a tractor 201 drawn trailer 202, trucks, busses, trains, and the like. In some embodiments, the device 100 may comprise one or more, such as a plurality, of vent apertures 11 which may be in communication with a source of pressurized air, such as a compressor 12, which may be configured to deliver pressurized air to the vent apertures 11. A heating element 13 may be disposed proximate to the vent apertures 11. Preferably, the vent apertures 11 and heating element 13 may be coupled to a roof surface 205, and the roof surface 205 may be coupled to all or portions of a roof of a vehicle 200. A control unit 51 may be configured to govern the flow of pressurized air through the vent apertures 11 and to govern the ability of the heating element 13 to produce heat. Heat may be applied to the roof surface 205 by the heating element 13 to loosen and accumulated ice or snow 301, and pressurized air 91 released from the vent apertures 11 may dislodge and propel the ice or snow from the roof surface 205 and off the vehicle 200. Optionally, the device 100 may include a solar panel 14 which may be configured to deliver electrical power to one or more elements of the device 100.

The device 100 may comprise one or more heating elements 13 which may be coupled to a roof surface 205 and which may be configured to provide heat to the roof surface 205 thereby raising the temperature of all or portions of the roof surface 205. Preferably, the one or more heating elements 13 may be coupled to a roof surface 205 so as to be generally evenly spaced across the roof surface 205. In further embodiments, all or portions of a heating element 13 may disposed proximate, such as between 0.1 to 36 inches, to at least one vent aperture 11. In the example of FIG. 1, the heating element 13 is continuous and snaked back and forth across the roof surface 205. In further embodiments, a plurality of heating elements 13 may be disposed in a grid pattern or any other pattern which may allow heat from the heating elements 13 to preferably be evenly dispersed across the roof surface 205.

In some embodiments, a heating element 13 may comprise or be a device that converts electricity into heat through the process of resistive or Joule heating. Electric current passing through the heating element 13 encounters resistance, resulting in heating of the element 13. An electric heating element 13 may comprise one or more Peltier chips, metal heating elements, such as nichrome, Kanthal (FeCrAl), and the like, ceramic heating elements, such as molybdenum disilicide ($MoSi_2$), polymer heating elements, such as PTC rubber, composite heating elements, such as fine coil of nichrome (NiCr) resistance heating alloy wire, that is located in a metallic tube (of stainless steel alloys, such as Incoloy, or copper) and insulated by magnesium oxide powder, and Combination heating element systems, such as those using thick film technology, or any other device that converts electricity into heat.

In further embodiments, a heating element 13 may receive heat generated by the vehicle 200, such as by the engine of the vehicle 200, and convey this heat to a roof surface 205. In still further embodiments, a heating element 13 may utilize a liquid, such as antifreeze, to transport heat to the roof surface 205. For example, the liquid may comprise a volume of engine coolant which may be circulated through the engine of the vehicle 200 and through the roof of the vehicle 200. As another example, the liquid may be separate from the engine coolant of the vehicle 200 but may be in thermal communication with the engine coolant of the vehicle 200 and the liquid may be pumped through the roof of the vehicle 200. As a further example, the liquid may be in thermal communication with the engine exhaust system of the vehicle 200 and the liquid may be pumped through the roof of the vehicle 200.

Figure 6:
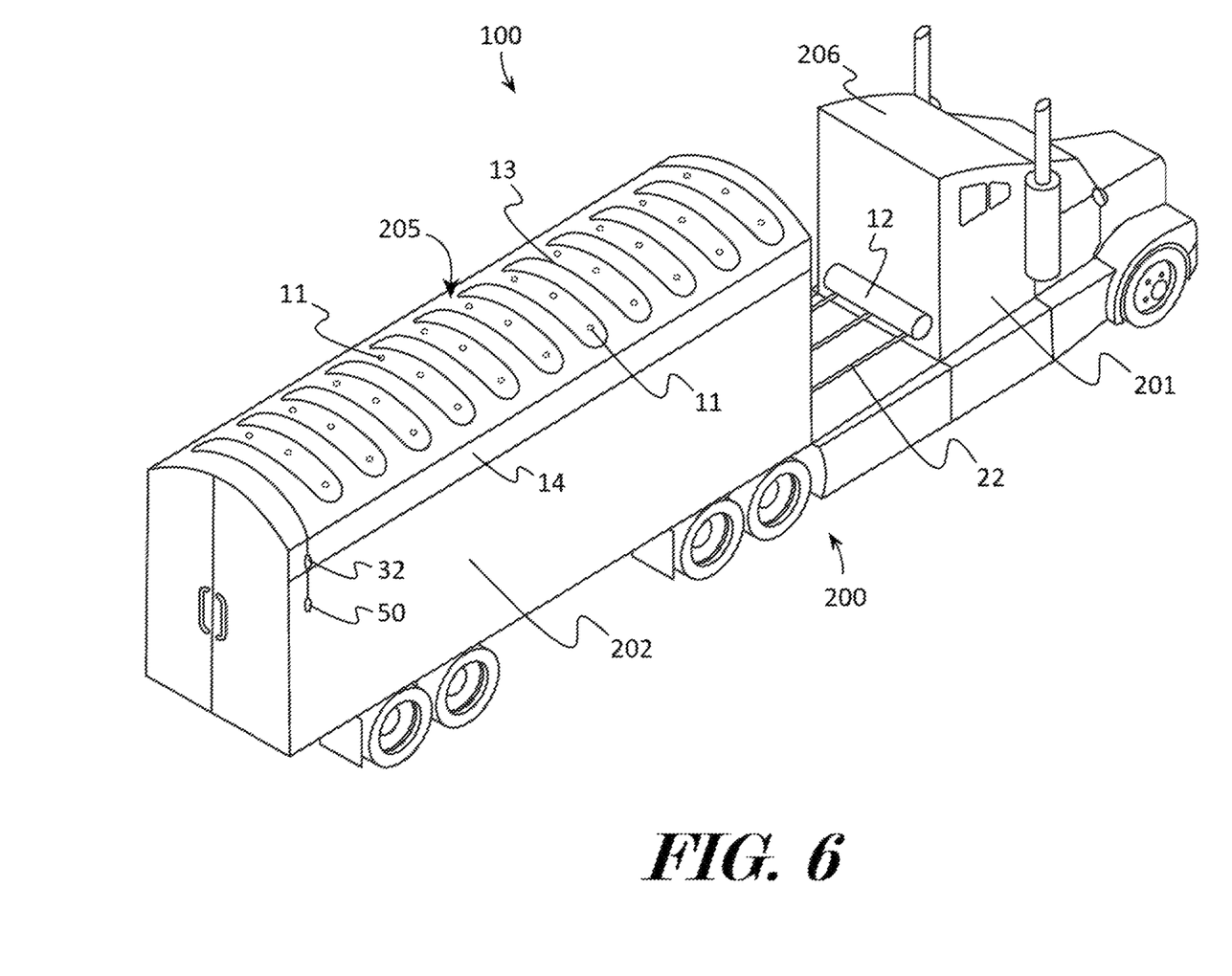
FIG. 6 shows a top rear perspective view of another example of a snow and ice removal device coupled to an exemplary vehicle according to various embodiments described herein.

The device 100 may comprise one or more, such as a plurality, of vent apertures 11 which may be disposed on the roof surface 205. The vent apertures 11 may be in communication with a source of pressurized air that may be configured to deliver pressurized air to the vent apertures 11. In some embodiments, the vehicle 200 may be or provide the source of pressurized air, such as a compressor used to power air brakes and other pneumatic elements of the vehicle 200. In other embodiments, the device 100 may comprise a compressor 12 for generating pressurized air 91. Pressurized air 91 may exit the vent apertures 11 to clear snow and ice accumulation 301 from the roof surface 205 as ejected accumulation 302 which may fall onto the ground or other surface proximate to the vehicle 200. One or more supply lines 22, such as duct work, air hoses, pipe, etc., or any suitable method may be used for coupling the vent apertures 11 to the compressor 12. Preferably, the vent apertures 11 may be disposed in a grid pattern (as shown in FIGS. 1 and 6) or any other pattern across the roof surface 205. For example, a grid pattern may be formed by 1000 vent apertures 11 dispersed across the roof surface 205 in ten columns with each column having one hundred vent apertures 11. Vent apertures 11 may be configured in any size and shape.

The device 100 may comprise a compressor 12 which may be configured to deliver pressurized air to the vent apertures 11. A compressor 12 may comprise any device that converts power (using an electric motor, diesel or gasoline engine, etc.) into potential energy stored in pressurized air. A compressor 12 may optionally include or be coupled to a tank for storing pressurized air. A compressor 12 may comprise a positive-displacement compressor which works by forcing air into a chamber whose volume is decreased to compress the air, such as a Piston-type air compressor, Rotary screw compressor, and Vane compressor, a Dynamic displacement air compressor which uses centrifugal force generated by a spinning impeller to accelerate and then decelerate captured air, which pressurizes the air, such as a centrifugal compressor, and an axial compressor, a compressor of the vehicle 200, such as used for air brakes, or any other device for generating pressurized air.

The communication of pressurized air 91 out of the vent apertures 11 may be governed by any suitable device or method for controlling the release of air, gasses, and/or liquids. In some embodiments, the device 100 may comprise one or more air valves 15 with each air valve 15 configured to govern the release of air from one or more vent apertures 11. In preferred embodiments, the device 100 may comprise two or more air valves 15 with each air valve 15 configured to govern the release of air from one or more vent apertures 11 independently from one or more other vent apertures 11.

Figure 3:
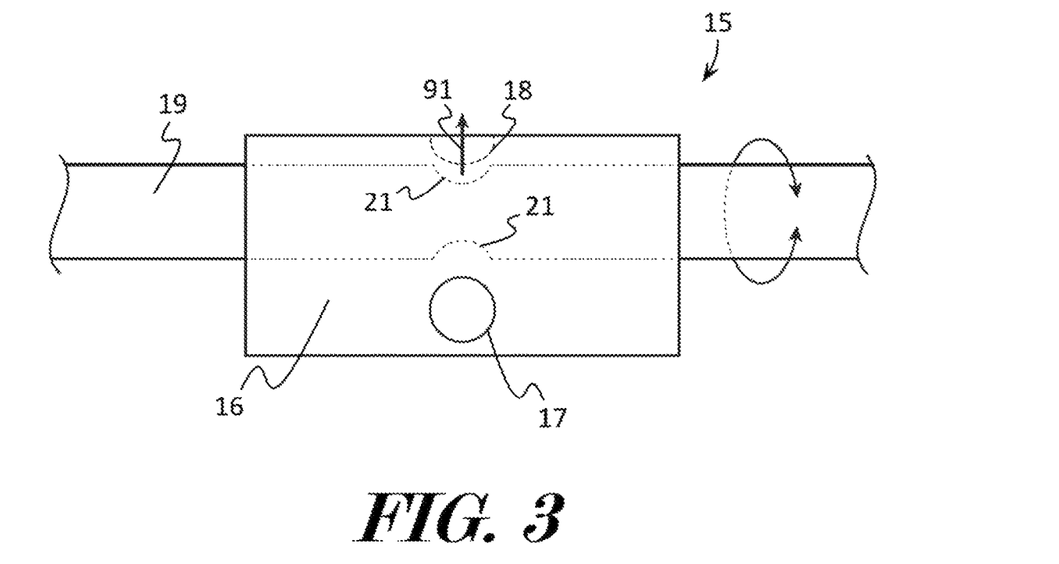
FIG. 3 and FIG. 4 show a perspective view of an example of an air valve in an open position and a closed position, respectively, according to various embodiments described herein.
Figure 4:
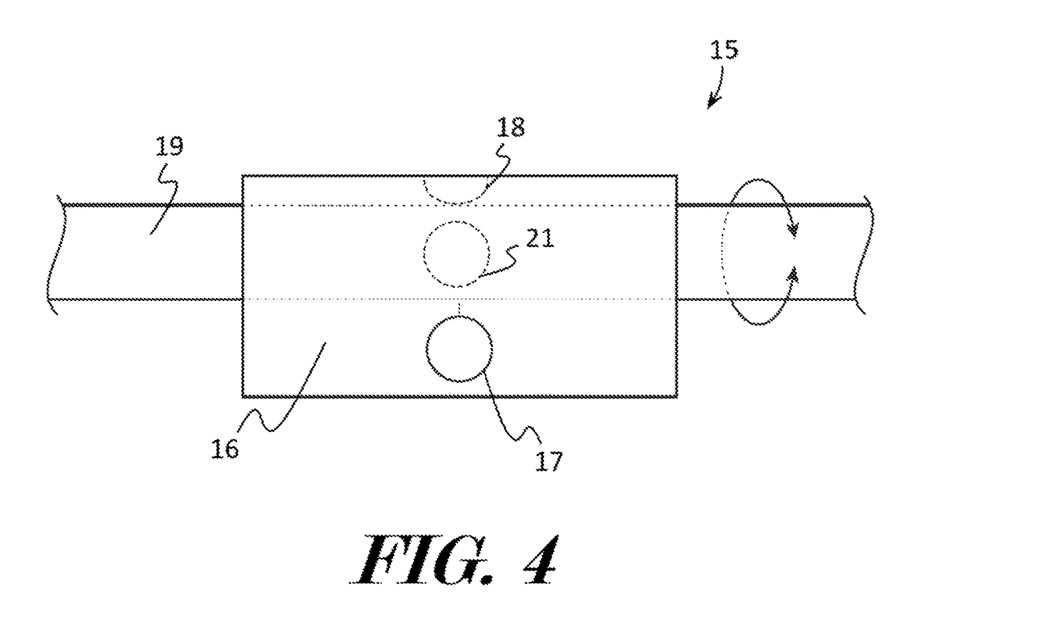

In some embodiments, and as shown in FIGS. 3 and 4, an air valve 15 may comprise a body 16 having an entrance aperture 17 and an exit aperture 18. The entrance aperture 17 may be in communication with the compressor 12, and the exit aperture 18 may be in communication with one or more vent apertures 11 or form a vent aperture 11. A control shaft 19 may be movably coupled to the body 16 and configured to extend through portions of the body 16. The control shaft 19 may comprise a governing aperture 21 extending through it, and the governing aperture 21 may govern the ability of air to pass from the entrance aperture 17 to the exit aperture 18. By rotating the control shaft 19 so that the governing aperture 21 is aligned with the entrance aperture 17 and exit aperture 18 as shown in FIG. 3, air supplied to the air valve 15 may pass through the apertures 17, 18, 21, to ultimately exit through one or more vent apertures 11. The control shaft 19 may be rotated by an electric motor, hydraulic motor, solenoid, or any other suitable device.

In other embodiments, an air valve 15 may comprise a flow control valve, pressure regulating valve, relief valve, ball valve, a gate valve, butterfly valve, diaphragm valve, globe valve, check valve, pressure balanced valve, locking valve, solenoid valve, or any other type of valve or controller which may be used to enable, disable, or otherwise govern the ability of air to exit through one or more vent apertures 11.

In some embodiments, the device 100 may comprise a roof surface 205 which may form a covering for upper portions of a vehicle 200 and/or which may form the upper portions of a vehicle 200, such as a tractor trailer roof or trailer roof. For example, in some embodiments, a roof surface 205 may comprise a length of material(s) which may be used to cover the roof of a trailer, truck, bus, or other vehicle. As another example, a roof surface 205 may comprise a length of material(s) which may function as the roof of a trailer, truck, bus, or other vehicle. In some embodiments, a roof surface 205 may be made from or may comprise a lightweight heat insulating material, such as rubber, plastic, fiberglass insulation, or any other heat insulating material. In further embodiments, a roof surface 205 may be made from or may comprise aluminum, steel, other metal material, or any other durable heat resistant material including combinations of materials. In preferred embodiments, all or portions of the roof surface 205 may comprise a smooth and/or polished surface treatment which may facilitate the shedding of snow and ice accumulation 301 off of the roof surface 205. In still further embodiments, a non-stick material, such as polytetrafluoroethylene (PTFE), may be used to form all or portions of the roof surface 205.

In some embodiments and as shown in FIG. 1, a roof surface 205 may comprise a generally flat or planar shape. In other embodiments, a roof surface 205 may comprise an elongated convex shape, such as a section of a curved face of a cylinder (convex in cross section) as shown in FIG. 6, so that snow and ice accumulation 301 may be shed or may fall on either elongated side of the vehicle 200. In other embodiments, a roof surface 205 may be configured with an elongated triangular prism shape so that snow and ice accumulation 301 may be shed or may fall on either elongated side of the vehicle 200. In still further embodiments, a roof surface 205 may be configured with any other shape and/or grooved in order to disperse snow and ice accumulation 301 to the sides of vehicle 200 in a predictable manner (at a desired flow angle), causing increased aerodynamics for snow and ice accumulation 301 dispersal from sides and rooftop of vehicle 200.

In some embodiments, the device 100 may comprise one or more solar panels 14 which may preferably be positioned on one or more sides of the vehicle 200, such as on portions of the right and left side of a trailer 202. A solar panel 14 may be in electrical communication with the control unit 50 and/or one or more other elements of the device 100, and the solar panel 14 may be configured to supply electrical power to one or more elements of the device 100. A solar panel 14 may comprise any electrical device, such as a photovoltaic cell or photovoltaic array that converts the energy of light directly into electricity by the photovoltaic effect. In some embodiments, a solar panel 14 may comprise Crystalline silicon photovoltaic cells, Thin Film photovoltaic cells, Multi junction photovoltaic cells, Perovskite solar cells, Liquid inks, Quantum dot solar cells, Dye-sensitized solar cells, Photon up-conversion and down-conversion solar cells, Organic/polymer solar cells, Adaptive solar cells, and/or any other type of cell which converts the energy of light into electricity using the photovoltaic effect.

In some embodiments, the device 100 may comprise one or more power sources 30 which may be in electrical communication with the control unit and which may provide electrical power to any component that may require electrical power. A power source 30 may comprise a battery, such as a lithium ion battery, nickel cadmium battery, alkaline battery, or any other suitable type of battery, a fuel cell, a capacitor, a super capacitor, or any other type of energy storing and/or electricity releasing device.

In further embodiments, the device 100 may comprise one or more recharge units 31 which may be in electrical communication with a power source 30 and/or any other element of the device 100. A recharge unit 31 may be configured to provide power to a power source 30, to re-charge a power source 30, and/or to provide electric power to an element of the device 100. In preferred embodiments, a recharge unit 31 may comprise a solar cell or photovoltaic cell which may convert light into electricity. Any type of photovoltaic cell may be used. Optionally, a roof surface 205 and/or photovoltaic cell type recharge unit 31 may include any suitable solar paint which may optimize surface space on roof surface 205 or other surface of a configured truck body such as that of a tractor trailer, box truck, tow truck, passenger car or any vehicle, so as to heat a surface that might have ice/snow accumulation. Additionally, solar paint may be used to increase the effectiveness of a photovoltaic cell of a recharge unit 31 to heat the photovoltaic cell so as to increase its efficiency. In still further embodiments, a photovoltaic cell type recharge unit 31 may include solar paint having photo-voltaic, nano-tubules of metal alloys and molecular varieties which can be aligned to promote conduction of electricity from light and/or heat. For example, solar paint, using titanium dioxide processed into nanotubes, may be used to convert sunlight into electricity.

In some embodiments, a recharge unit 31 may comprise a power cord, kinetic or piezo electric battery charging device, and/or inductive charging or wireless power receiver. In further embodiments, a recharge unit 31 may comprise a gasoline power generator, diesel power generator, or other type of electricity producing power generator. Optionally, a recharge unit 31 may comprise a power charging and distribution module which may be configured to control the recharging of the power source 30, discharging of the power source 30, and/or distribution of power to one or more components of the device 100 that may require electrical power. In some embodiments, a recharge unit 31 may comprise a wind turbine 33 which may be capable of generating electricity. For example, a wind turbine 33 may be disposed in the aerodynamic cowling 206 (or structure above the cab roof of a tractor 201 or the like) and may receive wind through a wind intake 34 to generate electrical energy for the heating elements 13 grid, solenoids which may operate the air valves 15 under forced air vent apertures 11, the charging and recharge of a power source 30, and/or optionally one or more other vehicle functions during vehicle 200 operation.

In some embodiments, the device 100 may comprise one or more thermostats 32 which may provide temperature data to a processor 51. The temperature data may describe the temperature of a roof surface 205, the temperature of air provided by the compressor 12 and/or vent aperture 11, and/or the temperature of the one or more heating elements 13. In preferred embodiments, the thermostat 32 may provide temperature data to a processor 51 to control or maintain the amount of heat generated by the one or more heating elements 13. A thermostat 32 may comprise a temperature sensor such as a thermocouple, a resistive temperature device (RTDs, thermistors), an infrared temperature sensor, a bimetallic device, a liquid expansion device, a molecular change-of-state device, a silicon diode, or any other type of temperature sensor configured to electrically communicate temperature information.

Figure 5:
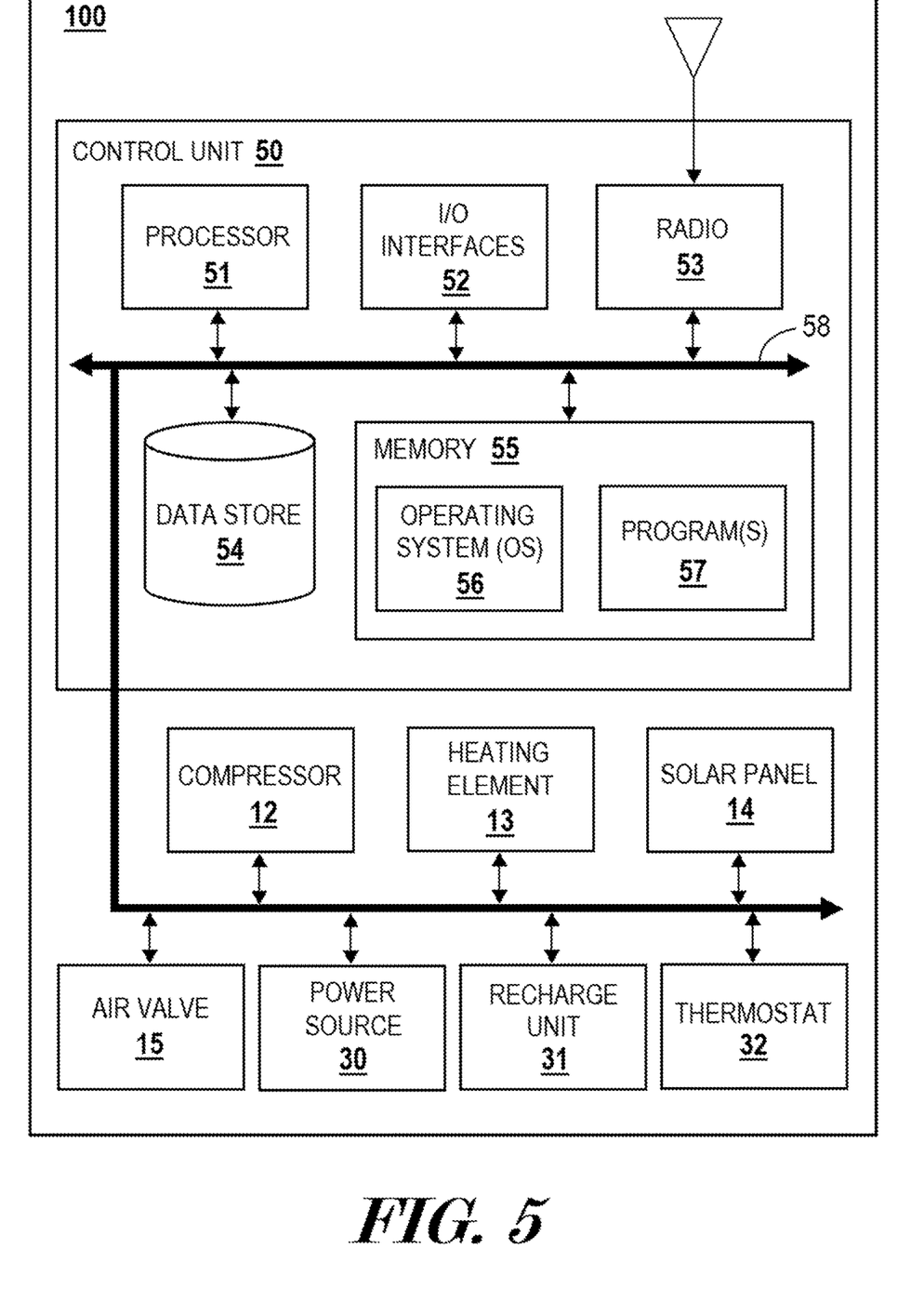
FIG. 5 illustrates a block diagram of some of the components of an example of a snow and ice removal device according to various embodiments described herein.

As perhaps best shown in FIG. 5, the device 100 may comprise a control unit 50 which may be in electronic communication with a compressor 12, heating element 13, solar panel 14, air valve 15, power source 30, recharge unit 31, and/or thermostat 32. In some embodiments and in the present example, the device 100 can be a digital device that, in terms of hardware architecture, comprises a control unit 50 which optionally includes a processor 51, input/output (I/O) interfaces 52, a radio 53, a data store 54, and memory 55. It should be appreciated by those of ordinary skill in the art that FIG. 4 depicts the device 100 in an oversimplified manner, and a practical embodiment may include additional components or elements and suitably configured processing logic to support known or conventional operating features that are not described in detail herein.

The components and elements (50, 51, 52, 53, 54, 55, 12, 13, 14, 15, 30, 31, 32) are communicatively coupled via a local interface 58. The local interface 58 can be, for example but not limited to, one or more buses, circuit boards, wiring harnesses, or other wired connections or wireless connections for providing electronic communication, as is known in the art. The local interface 58 can have additional elements, which are omitted for simplicity, such as controllers, buffers (caches), drivers, repeaters, and receivers, among many others, to enable communications. Further, the local interface 58 may include address, control, and/or data connections to enable appropriate communications among the aforementioned components.

The processor 51 is a hardware device for executing software instructions. The processor 51 can be any custom made or commercially available processor, a central processing unit (CPU), an auxiliary processor among several processors associated with the control unit 50, a semiconductor-based microprocessor (in the form of a microchip or chip set), or generally any device for executing software instructions. When the processing unit 50 is in operation, the processor 51 is configured to execute software stored within the memory 55, to communicate data to and from the memory 55, and to generally control operations of the device 100 pursuant to the software instructions. In an exemplary embodiment, the processor 51 may include a mobile optimized processor such as optimized for power consumption and mobile applications.

The I/O interfaces 52 can be used to by a user to provide input to the device 100, to receive output from the device 100, and/or to generally control functions of the device 100. The I/O interfaces 52 can also include, for example, buttons, knobs, switches, LED indicator lights, LED display, LCD display, a serial port, a parallel port, a small computer system interface (SCSI), an infrared (IR) interface, a radio frequency (RF) interface, a universal serial bus (USB) interface, and the like.

A radio 53 enables wireless communication to an external access device or network. In preferred embodiments, a radio 53 may operate via WiFi communication standards. In further embodiments, a radio 53 may operate on a cellular band and may communicate with or receive a Subscriber Identity Module (SIM) card or other wireless network identifier. Any number of suitable wireless data communication protocols, techniques, or methodologies can be supported by the radio 53, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

An optional data store 54 may be used to store data. The data store 54 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 54 may incorporate electronic, magnetic, optical, and/or other types of storage media.

The memory 55 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 55 may incorporate electronic, magnetic, optical, and/or other types of storage media. Note that the memory 55 may have a distributed architecture, where various components are situated remotely from one another, but can be accessed by the processor 51. The software in memory 55 can include one or more software programs, each of which includes an ordered listing of executable instructions for implementing logical functions.

In the example of FIG. 5, the software in the memory system 55 includes a suitable operating system (O/S) 56 and program(s) 57. The operating system 56 essentially controls the execution of input/output interface 52 functions, and provides scheduling, input-output control, file and data management, memory management, and communication control and related services. The operating system 56 may be, for example, LINUX (or another UNIX variant), Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like.

The program(s) 57 may include various applications, add-ons, etc. configured to provide end user functionality with the device 100. The program(s) 57 may comprise instructions which enable the processor 51 to control a compressor 12, one or more heating elements 13, and one or more air valves 15 to prevent and remove snow and ice accumulation from a roof surface 205 of a vehicle 200 to which the device 100 is coupled. In some embodiments, the program(s) 57 may enable the control unit 50 to control the amount or pressure of air that the compressor 12 may supply to one or more air valves 15. In further embodiments, the program(s) 57 may enable the control unit 50 to control the amount of air released from one or more vent apertures 11 via one or more air valves 15. For example, all the vent apertures 11 may release air simultaneously or the vent apertures 11 may release air sequentially, such as from the front of the vehicle 200 to the back or from one side to the other. In further embodiments, the program(s) 57 may enable the control unit 50 to control the amount and duration of heat generated by the one or more heating elements 13 via temperature information provided via the thermostat 32.

Further, many embodiments are described in terms of sequences of actions to be performed by, for example, elements of the control unit 50 which may be a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The control unit 50 may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by the processor 51. In addition, the main memory may be used for storing temporary variables or other intermediate information during the execution of instructions by the processor 51. The control unit 50 may further include a read only memory (ROM) or other static storage device (e.g., programmable ROM (PROM), erasable PROM (EPROM), and electrically erasable PROM (EEPROM)) coupled to the bus for storing static information and instructions for the processor 51.

While some materials have been provided, in other embodiments, the elements that comprise the device 100 such as the vent apertures 11, air valves 15, optional compressor 12, optional heating element 13, optional solar panel 14, roof surface 205, and/or any other element discussed herein may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Figure 7:
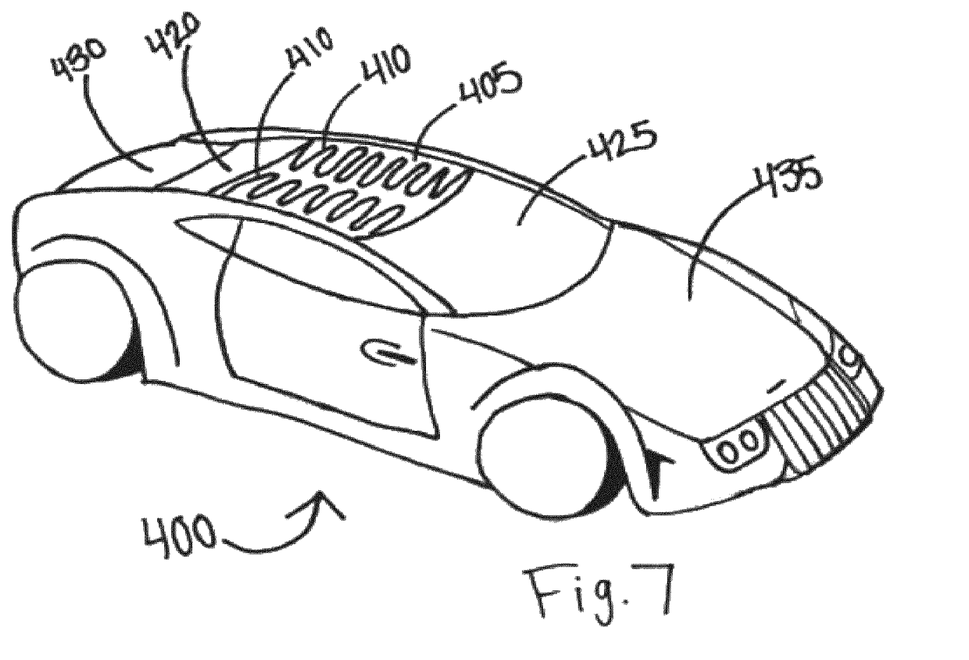
FIG. 7 shows a top perspective view of an automotive vehicle according to a further exemplary embodiment of the present invention and FIG. 8 shows a side view of an automotive vehicle according to a further exemplary embodiment of the present invention.

FIG. 7 illustrates a further exemplary embodiment of the present invention. FIG. 7 illustrates vehicle 400 that includes one or more heating elements for removing snow or ice from the roof of a vehicle. Vehicle 400 includes front windshield 420 and rear windshield 425. When vehicle 400 is moving forward, a driver normally sits within vehicle 400 (unless vehicle 400 is a class 5 autonomous vehicle) and looks through front windshield 420 as vehicle 400 moves forward. An engine is typically situated under hood 430 and a trunk for cargo transportation is typically situated under trunk lid 435.

Between front windshield 420 and rear windshield 425 is situated roof 405. On a top of roof 405 (or near the top of roof 405) is situated one or more heating elements 410. In one embodiment, there is a single heating element that spans roof 405. In another embodiment, multiple heating elements 410 span roof 405. Roof 405 is a "top surface" of vehicle 400, but a vehicle may have other top surfaces. For example, a pickup truck includes several top surfaces, such as the top surface of the roof, the top surface of the hood, and the top surface of the truck bed. Thus, in this exemplary embodiment, the heating elements are between front windshield 420 and trunk lid 435, but this is merely exemplary. In other exemplary embodiments, the heating elements are located on any top surface of a motorized vehicle.

Each (one or more) heating element 410 is situated in a manner so that snow or ice may melt off of roof 405 when heating element 410 is energized. Thus the one or more heating elements should preferably extend across at least half the length of roof 405 (length extends from the front windshield 420 to the rear windshield 435). Furthermore, the one or more heating elements should preferably extend across at least half the width of roof 405 (width extends from the driver side door of vehicle 400 to the passenger side door of vehicle 400). The "at least half" feature may be satisfied by a single heating element or by a plurality of heating elements next to each other.

FIG. 7 illustrates heating element 410 in an S-shaped configuration, but this is merely exemplary. Other shapes to heating element 410 may be contemplated, including straight, Z-shaped, etc. Furthermore, while FIG. 7 illustrates two exemplary heating elements 410 in respective locations, these locations are also exemplary as other locations may be used. For example, the heating elements may be shifted away from the driver and passenger doors and closer to (or at) a center of roof 405.

Heating element 410 is comprised of a resistive material that produces heat when electric current flows therethrough. For this purpose, heating element 410 is coupled to a source of electricity as further described below. When the electricity flows through the resistive material, heat is generated. The generated heat causes snow and/or ice on roof 405 to melt.

Heating element 410 is situated on roof 405 (or another top surface) in a variety of different manners. In one manner, heating element 410 is situated in grooves within roof 405, the grooves of sufficient diameter for element 410 to be situated therein. Such grooves, for example, may have an interior diameter that is substantially the same as the exterior diameter of heating element 410. In another manner, roof 405 includes a continuous surface (or several continuous surfaces) and heating element 410 sits on top of roof 405. A further layer may then be placed on top of heating element 410. The further layer may serve several functions, such as the dissipation of heat, preventing a person being burned from direct contact with heating element 410, aesthetic purposes, etc. The additional layer may be located, for example, above heating element 410 (but not past it on either side thereof, so that the existence and/or configuration of heating element 410 is discernable from above), above heating element 410 (but past it on either side thereof, so that the existence and/or configuration of heating element 410 is discernable from above), above multiple heating element 410, continuously over multiple heating elements if multiple heating elements exist, and towards and/or terminating at edges of roof 405 (so the existence and location of heating element(s) 410 cannot be discerned from above). In addition to being above heating element 410, the further layer may be in other locations relative to heating element(s) 410, including along one or more sides, below, around, or a combination thereof. Heating element 410 may be attached to the top of vehicle 400 using a protective material about the heating element that is self-adhering to the top of vehicle 400, and/or may be adhered to the top of vehicle 400 using a chemical that creates chemical or mechanical bonding, such as certain types of adhesives, certain types of resins, an insulating material such as resin that is adhered to the vehicle top using a friction hold, etc.

In one or more exemplary embodiments, heating element 410 is comprised of a resistive heating element that generates heat by the phenomena of joule heating. Materials engineered to have properties suitable for resistance heating element applications must have sufficient internal electrical resistance, high melting point, and sufficient elevated temperature strength. Resistance can vary with temperature and ideally the resistance is uniform to minimize variations with temperature or provide a linear change. Exemplary materials are metals such as copper or aluminum metallic alloys, ceramics, and ceramic metals.

Metallic Alloys

Nickel alloys—Nickel and nickel alloys are non-ferrous metals with high strength and toughness, excellent corrosion resistance, and superior elevated temperature properties.

NiCr alloys—Nickel-chrome alloys, are characterized by high resistivity, good oxidation and corrosion properties, and are suitable for element temperatures up to 1,250° C.

FeCrAl alloys—Iron-chrome-aluminum alloys offer reduced weight and longer life expectancy when compared to NiCr alloys.

CuNi alloys—Copper nickel, also known as cupro-nickel, alloys exhibit medium resistivity and low temperature coefficient and is less commonly used in heating elements.

Molybdenum alloys—Molybdenum is a refractory metal with a very high melting point, high corrosion resistance, and a relatively high density. Molybdenum heating elements have an upper temperature operating range of approximately 1,900° C. and are suitable for vacuum or gas protected high-temperature furnaces.

Tungsten alloys—Tungsten is a refractory metal with the highest melting point and lowest vapor pressure of all metals. It has high corrosion resistance and a relatively high density. Tungsten heater elements have an upper temperature operating range of approximately 2,500° C. and are suitable for high temperature controlled atmosphere applications.

Ceramics

Graphite—Graphite is a carbon material with an anisotropic or hexagonal crystal structure. Graphite heating elements are brittle, inexpensive, possess low resistivity, and have a low expansion coefficient. They do no degrade from thermal cycling; however, they require higher operating currents and are susceptible to contamination due to open porosity. Graphite elements may be coated to improve operating characteristics.

SiC—Silicon carbide is a refractory ceramic compound of silicon metalloid and oxygen. SiC heating elements are relatively cheap to manufacture when compared to MoSi2. They have an upper temperature operating range of approximately 1,625° C. SiC can be treated and form a protective SiO2 skin that prevents further oxidation at very high temperatures in non-reducing atmospheres.

Ceramic-Metals (Cermet)

MoSi2—Molybdenum disilicide exhibits excellent resistance to oxidation, is widely used in reducing atmospheres, and is suitable for temperatures up to 1,850° C. MoSi2 elements support high power densities and are less susceptible to thermal degradation when compared to SiC and nickel alloys. Its surface decomposes forming a protective layer of silica glass when exposed to oxygen at elevated temperatures.

PTC Rubber Materials

Composite Heating Elements

Tubular (sheathed) elements normally comprise a line coil of nichrome (NiCr) resistance heating alloy wire, that is located in a metallic tube (of stainless steel alloys, such as Incoloy, or copper) and insulated by magnesium oxide powder. To keep moisture out of the hygroscopic insulator, the ends are equipped with beads of insulating material such as ceramic or silicone rubber, or a combination of both. The tube is drawn through a die to compress the powder and maximize heat transmission. These can be a straight rod (as in toaster ovens) or bent to a shape to span an area to be heated (such as in electric stoves, ovens and coffee makers).

Screen-printed metal—ceramic tracks deposited on ceramic insulated metal (generally steel) plates have found widespread application as elements in kettles and other domestic appliances since the mid-1990s.

Radiative heating elements (heat lamps): A high-powered incandescent lamp usually run at less than maximum power to radiate mostly infrared instead of visible light. These are usually found in radiant space heaters and food warmers, taking either a long, tubular form or an R40 reflector-lamp form. The reflector lamp style is often tinted red to minimize the visible light produced; the tubular form comes in different formats:

Gold coated A gold dichroic film is deposited on the inside that reduces the visible light and allows most of the short and medium wave infrared through. Mainly for heating people. A number of manufacturers now manufacture these lamps and they improve constantly.

Ruby coated—Same function as the gold-coated lamps, but at a fraction of the cost. The visible glare is much higher than the gold variant.

Clear—No coating and mainly used in production processes.

Removable ceramic core elements use a coiled resistance heating alloy wire threaded through one or more cylindrical ceramic segments to make a required length (related to output), with or without a centre rod. Inserted into a metal sheath or tube sealed at one end, this type of element allows replacement or repair without breaking into the process involved, usually fluid heating under pressure.

Combination Heating Element Systems

Thick film technology: Heating elements for high-temperature furnaces are often made of exotic materials, including platinum, Tungsten di silicide/Molybdenum disilicide, molybdenum (vacuum furnaces) and silicon carbide. Silicon carbide igniters are common in gas ovens. Laser heaters are also being used for achieving high temperatures in thick film technology.

The shape of heating element 410 may be wire or ribbon, straight or coiled.

In one exemplary embodiment of the present invention, heating element 410 may be formed by incorporating nanotechnology. Nano crystals of appropriate molecular alloys or exotic materials can be used. See also: Carbon nanotube-based flexible electrothermal film heaters with a high heating rate, Song-Lin Jia, et al., Royal Society Open Science, Jun. 6, 2018, which is incorporated herein by reference.

By aligning nano crystals in a temporarily viscous substrates, the nano crystals can striate or migrate to opposite ends of the substrate to create positive/negative poles. This can be done with linear screeding, chemical leaching, magnetics, or other means.

In another embodiment, thin film technology can be used for heating.

In another embodiment, a heating element can be surrounded by an optional insulator, and can then be surrounded by a protective cover, such as aluminum, carbon fiber, fiberglass, etc.

In another embodiment, a heating element, comprised for example of cubic boron arsenide or graphene tubules is embedded in a material such as silicone, covered with aluminum, carbon fiber, or fiberglass for rigidity.

In another embodiment, carbonized fiber, with graphite or diamond added, may be used for heat transmission.

In another embodiment, red silicone rubber with elongated grooves is provided. A flexible heating element could be poured into the grooves as a liquid, then congealed. This can be covered with carbon fiber or other heat conducting material (e.g. aluminum, fiberglass, etc.).

In another embodiment, Taking Cubic Boron Arsenide or Graphene Tubules and mixing it with liquid Silicone in a highly saturated (dense) formula along with former ingredients to produce a flexible heating element and then placing thin wire into or inside each strip of that Silicone before congealing from liquid to solid. This specially prepared flexible heating element would then be inserted into or glued onto another piece of Insulating Rubber or other material (thin film substrate) so as to allow the product to be rolled or molded onto the roof of a vehicle for easier application to subject structure.

The heating element(s) is then connected to a source of electricity. An exemplary source is a car battery, although a source of electricity other than the car battery may also be used. For example, as an alternative source of electricity, a solar panel as described above may be used. Other sources of electricity may be used, as described above with reference to the first exemplary embodiment.

The first described embodiment of the present invention refers to FIG. 5 in order to control various components.

Many of the features of FIG. 5 may be adapted in order to control heating element(s) 410 as described above. In one embodiment, the features of FIG. 5 may be used, but since forced air is not also used, air valve 15 may be omitted. Furthermore, many features of the first embodiment described above may be incorporated into the second embodiment of the present invention as described above.

The above embodiment has described and illustrated a passenger car in accordance with an exemplary embodiment of the present invention. It is understood, however, that exemplary embodiments of the present invention may be implemented on the roof of other motorized vehicles, such as trucks, boats, airplanes, etc.

In another exemplary embodiment of the present invention, the heating elements are placed on another top surface, namely the top surface of the truck bed of a pickup truck. The heating elements may be covered with a protective cover such as a cover in which the heating elements are covered with silicone. The heating elements can then be attached or embedded to a material such as a high temperature sheet material, such as a high temperature tarp material. In another embodiment, the heating elements are attached to a high temperature sheet material, such as a high temperature tarp material without the use of a further heat insulator such as silicone. Exemplary tarp materials include high temperature coated fabrics, fiberglass fabrics, and silica fabrics. In another exemplary embodiment, Resorcinol Formaldehyde Latex may be used. Other tarps include silicone coated fiberglass, acrylic coated fiberglass, heat treated fiberglass, aluminum fiberglass, etc. The tarp, with the heating elements attached thereto, may be folded or rolled when not in use, and may be unfolded or unrolled and then placed in the truck bed. In another embodiment, the heating wires are attached to the truck bed, and covered with a material such as silicone so damage thereto is prevented.

Figure 8:
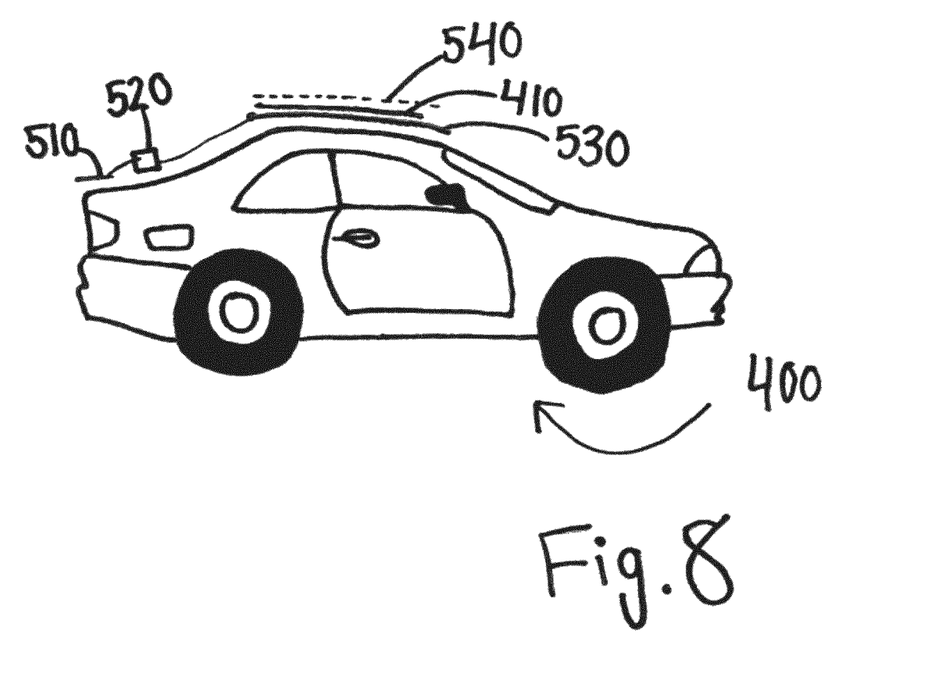

FIG. 8 is a side view according to further exemplary embodiment of the present invention. Heat resistant sheet 530 may be stored when not in use, and may be unfolded/unrolled and placed onto the top (roof) of vehicle 400 prior to inclement weather. Sheet 530 includes heating element 410 and optional upper sheet 540 that may cover heating element 410 for safety and/or aesthetic reasons. Features may be provided (not shown) to secure sheet 530 to the top surface of a vehicle. Heating element 410 may be coupled to optional power storage device (i.e. a battery) and an electricity generating device such as solar panel 510. In this manner, sheet 530 may sit on the top of vehicle 400 while parked and may then be removed from the top of vehicle 400 prior to being driven. Sheet 530 may be placed on other parts of a vehicle, such as a pickup truck bed to melt snow and ice in a manner similar to that as performed by sheet 530 as illustrated in exemplary FIG. 8.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

The invention claimed is:

1. A snow and ice removal device for a vehicle having a top surface, comprising:
   a heat producing element comprised of electrically resistive material, and that is coupled to the top surface of the vehicle, the top surface having grooves therein with the heat producing element situated in the grooves, wherein the heat producing element creates heat above the top surface; and
   a heat dissipation layer above the heat producing element to disperse heat from the heat producing element situated in the grooves of the top surface; and
   an electrical source, wherein electricity from the electrical source causes the resistive material to create heat.

2. A device according to claim 1, further comprising fixation material for securing the heat producing element to the top surface of the vehicle.

3. A device according to claim 1, wherein the roof surface is between a front windshield and a rear windshield of the vehicle.

4. A device according to claim 1, further comprising an insulating material that is located below the heat producing element.

5. A device according to claim 2, wherein the heat producing element is copper.

6. A device according to claim 2, wherein the heat producing element is fixed to an insulating material.

7. A device according to claim 2, wherein the heat producing element includes nanoparticles.

8. A device according to claim 1, wherein the heat producing element is embedded into the roof surface.

9. A device according to claim 1, wherein the heat producing element is inserted into the grooves as a liquid, and then congealed into a flexible heating element.

10. A device according to claim 2, wherein the electrical source is a car battery.

11. A device according to claim 1, wherein the vehicle is a pickup truck, and the heat producing element extends across a bed of the pickup truck.

12. A method of removing snow and ice from a vehicle having a roof surface with the snow and ice removal device of claim 1, said method comprising the steps of:
   a) permitting a source of electricity to be energized;
   b) channeling the electricity to a heat producing element above the roof surface.

13. A method according to claim 11, wherein the heat producing element is a resistive element, and electricity from the source of electricity causes the resistive material to create heat.

14. A method according to claim 11, wherein the roof surface is between a front windshield and a rear windshield of the vehicle.

15. A method according to claim 13, wherein the vehicle is motorized.

16. A method according to claim 12, wherein the heat producing element is copper.

17. A method according to claim 12, further comprising dissipating heat from the heat producing element situated in the grooves of the top surface of the vehicle with the heat dissipation layer.

18. A method according to claim 12, wherein the heat producing element includes nanoparticles.

19. A method according to claim 11, wherein the heat producing element is embedded into the roof surface.

20. A method according to claim 11, further comprising inserting the heat producing element into the grooves as a liquid, wherein the liquid heat producing element is congealed in the grooves into a flexible heating element.

* * * * *